United States Patent [19]

Snider, Jr. et al.

[11] 4,443,119
[45] Apr. 17, 1984

[54] ROLLER BEARING HOT BOX SENSOR

[75] Inventors: Hugh H. Snider, Jr., Silver Spring; Richard A. Marion, Laurel, both of Md.

[73] Assignee: The United States of America as represented by the Secretary of the Navy, Washington, D.C.

[21] Appl. No.: 375,141

[22] Filed: May 5, 1982

[51] Int. Cl.$^3$ .............................................. G01K 13/08
[52] U.S. Cl. ................................................... 374/153
[58] Field of Search ................ 374/153; 337/384, 395

[56] References Cited

U.S. PATENT DOCUMENTS

| | | | |
|---|---|---|---|
| 557,650 | 4/1896 | Chockley | 374/153 |
| 1,907,540 | 5/1933 | Hebler | 374/153 |
| 3,684,994 | 8/1972 | Tyler | 337/395 X |
| 4,244,140 | 1/1981 | Kim | 337/395 X |

Primary Examiner—Gerald Goldberg
Assistant Examiner—Joseph W. Roskos
Attorney, Agent, or Firm—R. F. Beers; K. E. Walden; J. C. LaPrade

[57] ABSTRACT

A roller bearing hot box sensor utilizing a metallic temperature sensitive elongated wire element. The wire element contracts at temperatures in the range of about 125° F. to about 225° F. so that when the contraction movement of the wire is attached to a connector means that operates a firing pin. Movement of the wire element initiates an electrical battery or other power source and thereby transmits electrical current to a signaling device, that gives a signal.

10 Claims, 4 Drawing Figures

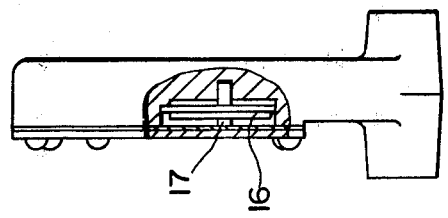
FIG. 4
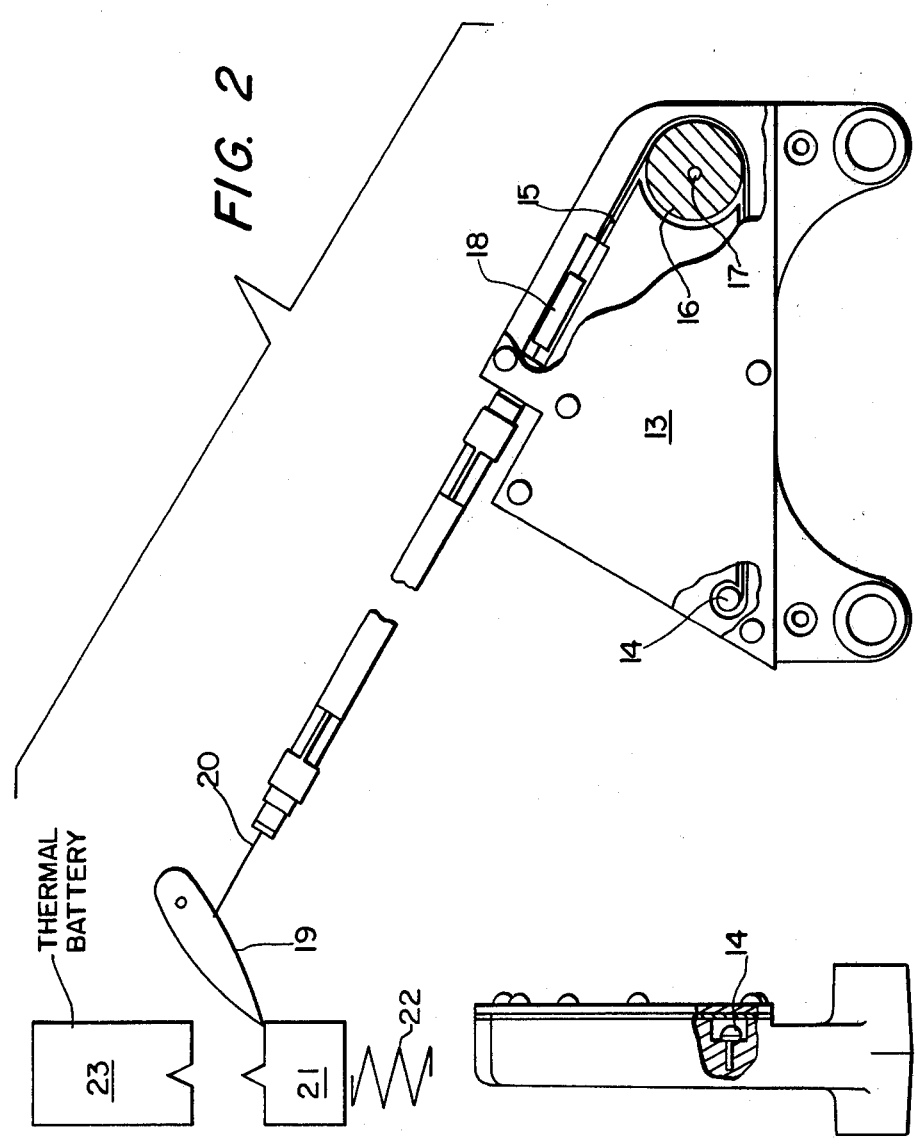
FIG. 2
FIG. 3

ROLLER BEARING HOT BOX SENSOR

BACKGROUND OF THE INVENTION

This invention relates to a hot box sensor that can be used in combination with the patented Dot Star System (U.S. Pat. Nos. 3,929,308; 3,930,629 and 4,029,859) issued to John Armstrong et al that will apply the train brakes upon sensing an overheated wheel bearing condition. In the prior art, there are wayside monitoring systems for trains that detect wheel bearing overheating. These systems are not mounted on the train but were mounted in an infrared sensing unit mounted by the side of the rail to detect the temperature of the bearing area by infrared (hereinafter IR) waves so as to measure the wave length and thereby indicates the temperature. This system is in use commercially now and is very expensive. A typical IR detection system cost over $50,000 each. Consequently, the railroads can not afford a great number of IR wayside systems. Because of the great cost the IR detectors are rarely placed less than 25 to 50 miles apart.

The wayside system also requires a person to read the master monitor signal and issue a stop signal to the train. Therefore the wayside systems has several drawbacks: (1) the system is very expensive; (2) the system is not a continuous monitor. Wheel bearings might overheat and fail causing, derailment within a 5 or 6 mile stretch of track never having passed a wayside IR monitor; and (3) the system requires a person to make constant readings.

There is also a detector system using a plug called a "stink plug" that is presently used, in very limited numbers. This plug gives off a strong odor when the train wheel bearing overheats. When and if a conductor at the rear of the train detects the odor and stops the train or radios ahead, to stop the train.

Therefore, from a cursory review of the prior art temperature sensors it should be very clear that a continuous monitor or detector (to detect roller bearing temperature) is needed in the railroad industry.

SUMMARY OF THE INVENTION

In summary, the instant invention comprises a temperature sensing element usually a wire cable or other metal or metal alloy element that has a shaped memory effect, (SME) that is used in combination with the inventive hardware of this invention. The temperature sensing element is to be located adjacent to or in close proximity to a wheel bearing member. Use of an element with shaped memory effect (SME) is an important part of this invention. Upon excessive heating of the bearing to a temperature of more than 70° to 80° C., but not limited to that is always associated with a wheel bearing during wheel bearing failure, the excessive heat will be transmitted to the metal alloy that may be a wire with "SME" in a heat sensor causing the sensor at a critical, transition temperature to contract or draw up and thereby transmits a pulling motion on a switch element associated with a thermal battery or other electrical apparatus so as to give or signal a dangerous overheated condition in the bearing or other train wheel element adjacent to the bearing structure or bearing adapter.

OBJECTS OF THE INVENTION

It is one object of the invention to provide a self contained roller bearing hot box sensor utilizing a metal alloy that has shaped memory effect (SME), such as Nitinol or a functional equivalent material.

It is another object of the invention to provide a self contained roller bearing hot box sensor that is capable of detecting temperature increases in the roller bearing or any associated, adjacent or attached metallic element and transmitting a physical signal when detection occurs to an electrical apparatus that then stops the train, in response to the signal.

It is an additional object of this invention to provide a temperature sensing device that is capable of, when a designated temperature is reached, providing motion or movement, particularly a pulling movement that is sequence pulls a switch or other electrical element.

It is a still further object of this invention to provide a roller bearing hot box sensor that is continuous in that the sensor may be used in connection with, and physically located adjacent to each and every wheel bearing in the entire train, so as to give complete and continuous surveilence of each wheel bearing element.

It is a still further object of this invention to provide a roller bearing hot box sensor that does not require any outside electrical power to operate.

It is also one additional object to provide a hot box sensor that can initiate a thermal battery and produce current that is in communication with the Dot Star Sensor System for trains disclosed and claimed in U.S. Pat. Nos. 3,929,308, 3,930,629 and 4,029,859.

It is still further important object of this invention to provide a roller bearing hot box sensor that is inexpensive and not prone to accidental initiation.

It is one additional object of this invention to provide a roller bearing hot box sensor that may be used in conjunction with the Dot Star patented train stopping systems as defined and claimed in the aforesaid U.S. Patents, so as to automatically stop the train upon sensing an overheating roller bearing.

It is still a further object of this invention to provide long term (more than 5 years) functional service without maintenance notwithstanding typical railroad environment such as shock, vibration and varied exposure to the elements.

BRIEF DESCRIPTION OF THE DRAWINGS

FIG. 2 is a detailed view of the sensor housing, partly in cross section showing the arrangement of the temperature sensitive wire or cable and its deployment through the housing.

FIG. 3 is an end view of the housing of FIG. 2 with a partially cut away view.

FIG. 4 is an end view of the housing of FIG. 2 with a partially cut away view illustrating a pully which transmits the pulling force to the wire cable of this invention.

DESCRIPTION OF THE PREFERRED EMBODIMENT

Figure 1:
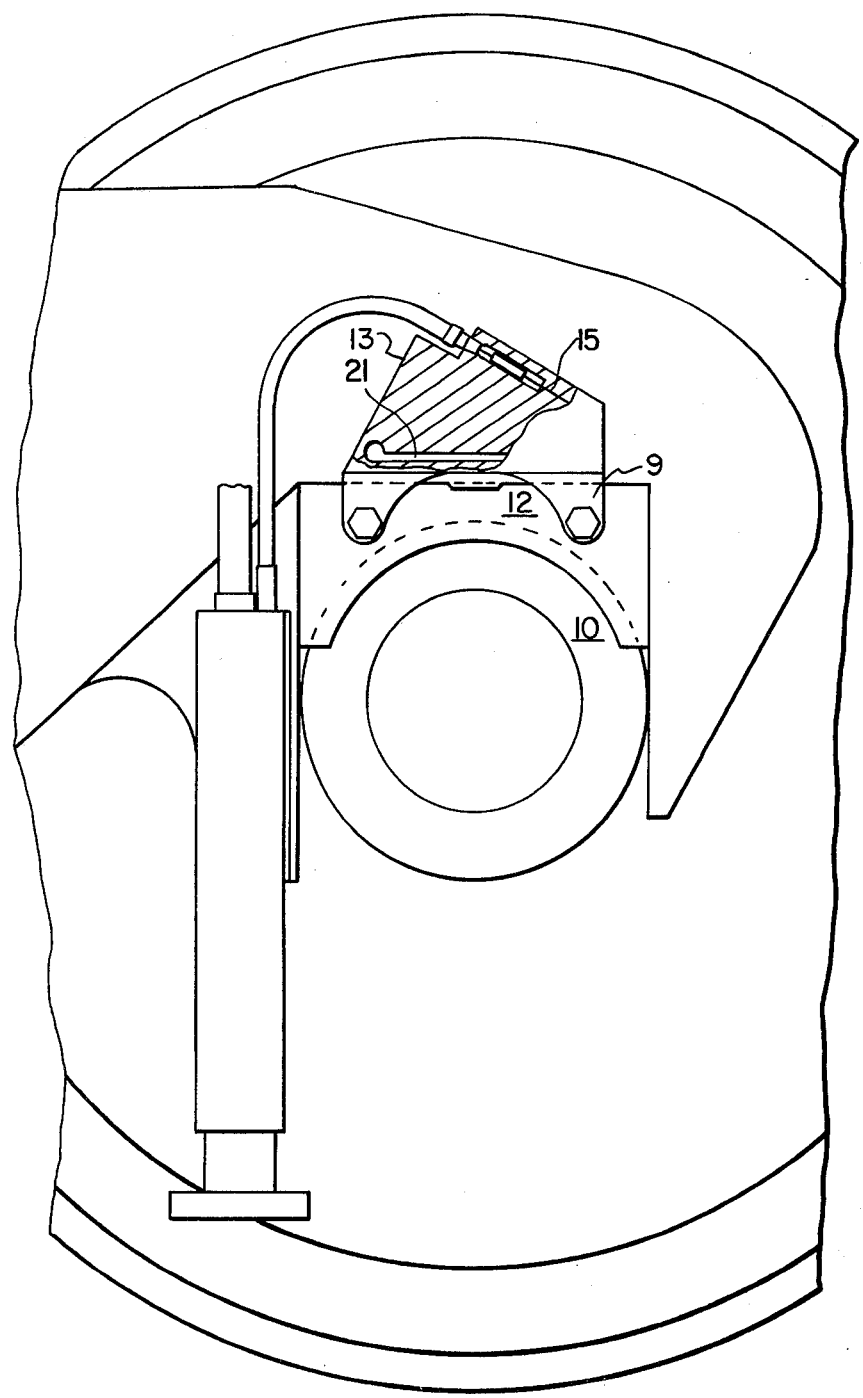
FIG. 1 is a partial isometric view illustrating the arrangement of the wheel bearing temperature sensing device of the instant invention.

In FIG. 2 a metallic housing, that is usually a cast aluminum housing 13 is mounted on the roller bearing adapter, element 12 in FIG. 1 may be fastened by bolts 9. The metal housing 13 has a channel 21 in its face to house a length of temperature sensitive Nitinol or functionally equivalent "SME" alloy wire or cable 15. The temperature sensitive "SME" wire or cable 15 is fitted in channel 21 and attached at one end by a fastening element 14 such as a screw. The cable or Nitinol wire 15 is fitted around a movable pivoted cable pully 16 mounted within the metal housing 13. Cable pully 16 is mounted on pivot 17. A Nitinol wire or other "SME" cable 15 may be attached at its upper most end to a cable or wire fastener 18. The fastener 18 is attached to a cam lever member 19 by conventional wire or cable or other suitable mechanism 20. When the cam lever is moved by contraction of Nitinol wire 15 it releases the firing pin 21 which is driven by spring 22 to thermal battery 23. The thermal battery 23 provides an electrical current flow that is electrically connected to the well known Dot-Star train stopping apparatus and system as disclosed and claimed in the three aforesaid U.S. Patents, issued to John Armstrong et al.

As illustrated in FIG. 1 the cable attachment means may in fact be located within a tubular leg and be physically attached or screwed into working contact with a cam lever, as at 19 in FIG. 2 so that when the cam lever 19 is released it directs a firing pin 21 or mechanism to activate a thermal battery 23.

It is not critical as to how the cable attachment means and thermal battery or other electrical device is located within the train wheel assembly.

In addition to Ni-Ti alloys known as "Nitinol" other alloys that contract or otherwise change shape at a transition temperature, usually above room temperature can be used. All of these alloys demonstrate a shape memory effect (SME). All alloys that contract or change shape at a designed transition temperature can be substituted for Nitinol. Usually the Nitinol contraction will vary from about 4% to 8%. An average contraction of a Nitinol alloy (55 Ni - 45 Ti) wire will average about 6% and in such case the contraction occurs at a temperature from 70° C. to 80° C.

For example, the Beta alloys manufactured by Delta Corporation in Great Britain and the Beta Alloys Manufactured by Ray Chemical Company, an American firm have shaped memory effect or "SME".

They can be substituted for and used in place of Nitinol alloys that demonstrate a shape memory effect (SME).

It should be understood that in the preferred embodiment of the invention a nitinol wire or equivalent wire alloy that is with "SME" is a conventionally obtainable wire.

Other well known metallic alloys that have low transition has a shape memory effect is a conventionally obtainable wire. Other well known metallic alloys that have low transition temperature in the range of 125° F. to 200° F. may be substituted for the Nitinol, such as the beta alloys mentioned above. In fact, a Nitinol alloy may be formulated to have a transition temperature in the range of 25° C. to more than 100° C. The preferable range is from 70° C. to 80° C. for a 55% Ni - 45% Ti alloy. In the preferred embodiment the 55 - 45 Ni-Ti will contract approximately 6%. In a wire length of 6 inches this translates to 0.360 inches. Any metal or metal alloy having a transition temperature of from about 125° F. to 275° F. will work in the sensor of this invention. Other "SME" alloys that are well known in the act may be substituted for the Nitinol cable or wire in the preferred embodiment of this invention.

Obviously, numerous modifications and variations of the present invention are possible in light of the above teachings. It is therefore to be understood that, within the scope of appended claims the invention may be practiced otherwise than as specifically described.

What is new and desired to be claimed by Letters Patent of the United States is:

1. A roller bearing, hot box temperature sensor designed to be mounted in a train with wheels, where the sensor functions to control and stop the train in response to temperature changes sensed in the wheel bearing assembly comprising a housing for mounting a temperature sensor in close proximity to a train wheel bearing assembly with an opening within said housing combined with metallic means capable of contracting in response to rapid increases in temperature and where one end of the metallic sensing means is permanently fixed on one end to the wheel bearing assembly and the opposite end of the metallic means is attached to a mechanical control means that is actuated by contraction of the said metallic means and where the contraction of the metallic means functions, through the mechanical control means to stop the train wheels when a certain temperature is reached.

2. The sensor of claim 1 wherein the metallic element is connected to an electrical power source that is activated by contraction of the metallic element.

3. The temperature sensor of claim 1 wherein the temperature sensitive metallic elements is a Nitinol wire having a transition temperature in the range of 125° F. to 225° F.

4. The temperature sensor of claim 1 wherein the temperature sensitive metallic elements is a metal alloy that has a shape memory effect at temperatures above room temperature.

5. A roller bearing, hot box, temperature sensor comprising a housing for mounting a temperature sensor in close proximity to a train wheel bearing, an elongated slotted opening designed to accommodate an elongated metallic alloy sensing cable, the said housing being mounted adjacent to and in close proximity with a train wheel roller bearing adapter, wherein the housing is fitted with means for fastening the housing to the roller bearing adapter, an elongated temperature sensing cable located in the said elongated slotted opening said cable being fixed on one end and in operating contact with a cam device on the other end.

6. The temperature sensor of claim 5 wherein the temperature sensing cable is Nitinol.

7. The temperature sensor of claim 6 wherein the Nitinol cable is pulled over a pulley that is intermediate, between one fixed end that is in operational attachment to a cam opener and one end that is attached to a cam follower device.

8. The temperature sensor of claim 6 wherein the Nitinol cable consists of an alloy of approximately 55% nickel and 45% titanium.

9. The temperature sensor of claim 8 wherein the transition temperature is in the range of 125° F. to 225° F.

10. The temperature sensor of claim 5 wherein the housing is in contact with the wheel roller bearing adapter.

* * * * *